(12) United States Patent
Sekoguchi et al.

(10) Patent No.: US 7,882,875 B2
(45) Date of Patent: Feb. 8, 2011

(54) PNEUMATIC TIRE WITH TREAD HAVING BOTTOM RAISING PORTIONS

(75) Inventors: Masaharu Sekoguchi, Hiratsuka (JP); Shinichi Mori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/265,408

(22) Filed: Nov. 5, 2008

(65) Prior Publication Data

US 2009/0218022 A1 Sep. 3, 2009

(30) Foreign Application Priority Data

Feb. 29, 2008 (JP) .............................. 2008-049449

(51) Int. Cl.
  B60C 11/11 (2006.01)
  B60C 11/13 (2006.01)
(52) U.S. Cl. ........................... 152/209.16; 152/209.18; 152/209.22; 152/209.28; 152/DIG. 3
(58) Field of Classification Search ............. 152/209.2, 152/209.3, 209.11, 209.16, 209.18, 209.21, 152/209.22, 209.24, 209.28, DIG. 3, 902
See application file for complete search history.

(56) References Cited

U.S. PATENT DOCUMENTS

| 4,462,447 | A | * | 7/1984 | Siefert et al. ................. 152/454 |
| 4,962,801 | A | * | 10/1990 | Tsuda .................... 152/209.28 |
| 5,000,239 | A | * | 3/1991 | Brayer et al. .......... 152/209.18 |
| 5,355,922 | A | * | 10/1994 | Kogure et al. ........... 152/209.18 |
| 5,370,168 | A | * | 12/1994 | Boiocchi et al. ........ 152/209.28 |
| 5,375,639 | A | * | 12/1994 | Suzuki et al. ............ 152/209.28 |
| 5,377,734 | A | * | 1/1995 | Klein et al. ............. 152/209.22 |
| 5,421,391 | A | * | 6/1995 | Himuro ................ 152/209.28 |
| 5,435,364 | A | * | 7/1995 | Hasegawa et al. ....... 152/209.18 |
| 6,450,223 | B1 | * | 9/2002 | Landers et al. ......... 152/209.28 |
| 6,691,753 | B2 | * | 2/2004 | Hanebuth et al. ....... 152/209.28 |
| 2003/0111151 | A1 | * | 6/2003 | Masaki .................. 152/209.28 |
| 2006/0060278 | A1 | * | 3/2006 | Noguchi et al. ......... 152/209.18 |

FOREIGN PATENT DOCUMENTS

| EP | 739758 | * | 10/1996 |
| GB | 738143 | * | 10/1955 |
| JP | 03-032907 | * | 2/1991 |
| JP | A 3-82610 | | 4/1991 |
| JP | 6-48119 | | 2/1994 |
| JP | 06-106916 | * | 4/1994 |
| JP | 06-320916 | * | 11/1994 |
| JP | 07-215013 | * | 8/1995 |
| JP | 9-58217 | | 3/1997 |
| JP | 11-268506 | | 10/1999 |
| JP | 11-321234 | | 11/1999 |

(Continued)

*Primary Examiner*—Steven D Maki
(74) *Attorney, Agent, or Firm*—Greer, Burns & Crain, Ltd.

(57) ABSTRACT

A pneumatic tire having shoulder blocks defined on a shoulder side of the tread surface by lateral grooves extending in the widthwise direction of the tire beyond a ground contact end of the tire, the shoulder blocks being arranged in the circumferential direction of the tire. A bottom-raising portion is provided only on a bottom of every other lateral groove of the lateral grooves. Two shoulder blocks adjacent in the circumferential direction of the tire are connected by the first bottom-raising portion.

7 Claims, 2 Drawing Sheets

FOREIGN PATENT DOCUMENTS

| | | | |
|---|---|---|---|
| JP | A 11-342707 | | 12/1999 |
| JP | 2002-059711 | * | 2/2002 |
| JP | 2002-274125 | | 9/2002 |
| JP | 2003-146017 | * | 5/2003 |
| JP | A 2003-175705 | | 6/2003 |
| JP | A 2006-82734 | | 3/2006 |
| JP | 2006-182180 | | 7/2006 |
| JP | 2006-192959 | | 7/2006 |
| JP | 2007-8342 | | 1/2007 |
| JP | 2007-69708 | | 3/2007 |
| JP | 2007-182094 | | 7/2007 |
| WO | WO 95/18022 | * | 7/1995 |

* cited by examiner

PNEUMATIC TIRE WITH TREAD HAVING BOTTOM RAISING PORTIONS

BACKGROUND OF THE INVENTION

The present invention relates to pneumatic tires, and more particularly, to a pneumatic tire which can improve dry performance.

Slick tires having a tread surface with no groove are used for racing carts when running on a sunny day. On the other hand, pneumatic tires having a tread surface with grooves (see Japanese Patent Application Kokai Publication 2003-175705, for example) are used for racing carts when running on a rainy day. A course for the racing carts includes half dried road surface sections having wet road surface conditions without water, and wet road surface sections having water thereon when running on a rainy day. When the carts run thereon, the carts may run also on the half dried road surface sections. In this case, the pneumatic tires for wet roads having grooves must degrade dry performance (driving stability) during running on the half dried road surface sections which conflicts with wet performance, requiring improvement thereof.

SUMMARY OF THE INVENTION

An object of the present invention is to provide a pneumatic tire capable of improving dry performance on a half dried road surface while suppressing reduction of wet performance.

In order to achieve the above object, the present invention provides a pneumatic tire having a tread surface, shoulder blocks being defined on a shoulder side of the tread surface by lateral grooves extending in a widthwise direction of the tire beyond a ground contact end of the tire, the shoulder blocks being arranged in a circumferential direction of the tire, wherein a first bottom-raising portion is provided only on a bottom of a portion of every other lateral groove of the lateral grooves so as to connect two shoulder blocks adjacent in the circumferential direction of the tire by the first bottom-raising portion, the portion being outward of the ground contact end of the tire in the widthwise direction of the tire.

According to the present invention mentioned above, since the shoulder blocks are connected via the bottom-raising portion, stiffness of the shoulder blocks can be enhanced. Therefore, tread stiffness on the shoulder side affecting cornering operation can be increased. As a result, driving stability during running on a half dried road surface can be raised, enabling dry performance on a half dried road surface to be improved.

On the other hand, the bottom-raising portion is not provided in each lateral groove but is provided only in every other lateral groove, and the bottom-raising portion is provided in the lateral groove portion outward of the tire ground contact end in the widthwise direction of the tire, whereby reduction of wet performance arising from the bottom-raising portion is suppressed, enabling wet performance to be kept at the same level as before.

DETAILED DESCRIPTION OF THE PREFERRED EMBODIMENT

An embodiment of the present invention will be described in detail below with reference to the attached drawings.

Figure 1:
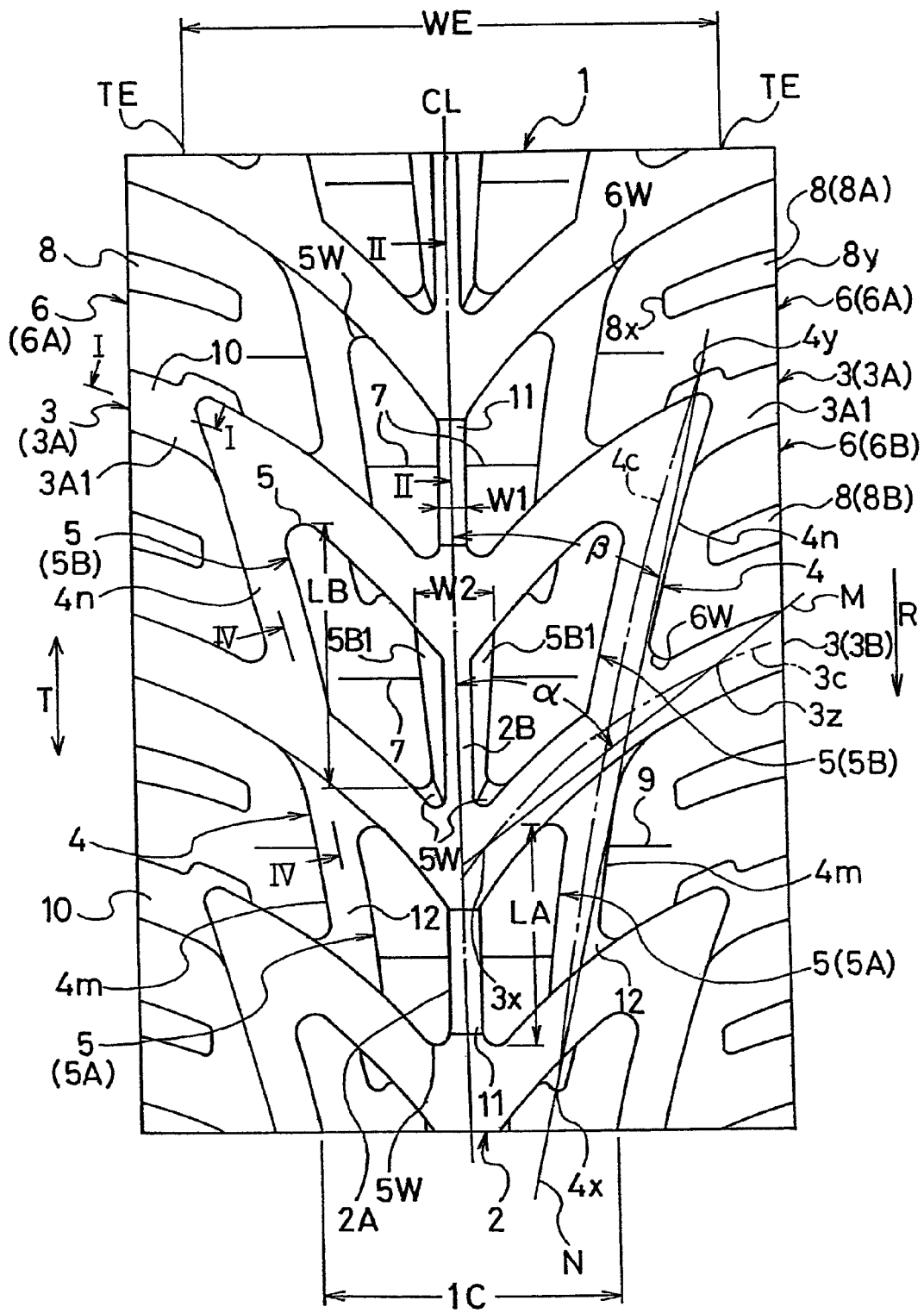
FIG. 1 is a partial development view of a tread surface showing an embodiment of a pneumatic tire according to the present invention.

Referring to FIG. 1, there is shown a main part of a pneumatic tire according to the present invention; reference numeral 1 denotes a tread surface. The pneumatic tire has a rotation direction specified in one direction shown by arrow R. A main groove 2 extending straight in the circumferential direction T of the tire is provided on the equatorial plane CL of the tire in the tread surface 1. Right and left first lateral grooves 3, which extend from the main groove 2 toward the opposite sides of the tire in the widthwise direction of the tire beyond ground contact ends TE of the tire, are disposed at prescribed intervals in the circumferential direction T of the tire. The lateral grooves 3 are disposed at symmetrical positions with respect to the equatorial plane CL of the tire, and extend outward in the widthwise direction of the tire in a circularly curved manner while inclining toward the reverse rotation direction of the tire. The lateral grooves 3 may extend in a straight manner instead of the circularly curved manner.

Right and left inclination grooves 4, which extend in an inclined manner with respect to the circumferential direction T of the tire, are provided on the opposite sides of the main groove 2 at prescribed intervals in the circumferential direction T of the tire. The inclination grooves 4 extend to the ground contact ends TE of the tire in a circularly curved manner. Each inclination groove 4 has a tire rotation direction side and a tire reverse rotation direction side which is more away from the main groove 2 than the tire rotation direction side, and has an inclination angle with respect to the circumferential direction T of the tire which gradually increases toward the tire reverse rotation direction side. The inclination groove 4 extends across three lateral grooves 3. The inclination grooves 4, like the lateral grooves 3, may extend in a straight manner instead of the circularly curved manner.

A plurality of center blocks 5 are defined by the main groove 2, right and left lateral grooves 3, and right and left inclination grooves 4 on the opposite sides of the main groove 2 in the tread surface 1. Also, a plurality of shoulder blocks 6 are defined by the right and left lateral grooves 3 and right and left inclination grooves 4 on the opposite shoulder sides of the tread surface 1.

The right and left inclination grooves 4 are disposed at symmetrical positions with respect to the equatorial plane CL of the tire, and have tire rotation direction side terminal ends 4x located in alternate center blocks 5 (second center blocks 5B) in the circumferential direction T of the tire and tire reverse rotation direction side terminal ends 4y located in alternate shoulder blocks 6 (first shoulder blocks 6A) in the circumferential direction T of the tire. The inclination grooves 4 have tire rotation direction side portions 4m and tire reverse rotation direction side portions 4n, respectively.

The center blocks 5 comprise right and left first center blocks 5A defined by the tire rotation direction side portions 4m of the right and left inclination grooves 4, main groove 2 and right and left lateral grooves 3, and right and left second center blocks 5B defined by the tire reverse rotation direction side portions 4n of the right and left inclination grooves 4, main groove 2 and right and left lateral grooves 3. The right and left first center blocks 5A and right and left second center blocks 5B are alternately disposed in the circumferential direction T of the tire, respectively.

Each first center block 5A has a circumferential length LA measured along the circumferential direction T of the tire, and each second center block 5B has a circumferential length LB measured along the circumferential direction T of the tire. The circumferential length LB of the second center block 5B is greater than the circumferential length LA of the first center block 5A. The second center block 5B is greater also in width than the first center block 5A. The first center block 5A and second center block 5B are each substantially in the form of a parallelogram in plan view and have obtuse-angled corners and acute-angled corners. Each of the acute-angled corners has a wall surface 5W which is circularly chamfered in cross section. Each center block 5 has a tread surface section, where one sipe 7 extending straight along the widthwise direction of the tire is provided in its central region in the circumferential direction of the tire.

The shoulder blocks 6 arranged in the circumferential direction T of the tire on each shoulder side comprise first shoulder blocks 6A which are adjacent to the first center blocks 5A via the tire rotation direction side portions 4m of the inclination grooves 4 and in which the tire reverse rotation direction side terminal ends 4y of the inclination grooves 4 are located, and second shoulder blocks 6B adjacent to the second center blocks 5B via the tire reverse rotation direction side portions 4n of the inclination grooves 4. The first shoulder blocks 6A and second shoulder blocks 6B are each in the form of a trapezoid and are alternately disposed in the circumferential direction T of the tire. The second shoulder blocks 6B are less in width than the first shoulder blocks 6A, and are smaller in size than the first shoulder blocks 6A. The first shoulder blocks 6A and second shoulder blocks 6B have acute-angled corners and obtuse-angled corners facing the inclination grooves 4. The acute-angled corners and obtuse-angled corners have wall surfaces 6W circularly chamfered in cross section.

Figure 2:
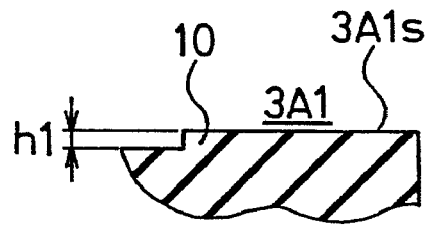
FIG. 2 is an enlarged cross-sectional view of the bottom of a lateral groove taken along line II-II of FIG. 1.

As shown in FIGS. 1 and 2, a first bottom-raising portion 10 is provided in every other lateral groove 3A between a first shoulder block 6A and a second shoulder block 6B adjacent thereto in the rotation direction of the tire. The every other lateral groove 3A has a lateral groove portion 3A1 located outward of the ground contact end TE of the tire in the widthwise direction of the tire. The lateral groove portion 3A has a bottom 3A1s which is higher than the bottom of the other groove portion of the lateral groove 3A such that the bottom of the every other lateral groove has a step profile. The first bottom-raising portion 10 is formed in the lateral groove portion 3A. The first bottom-raising portion 10 is located outward, in the widthwise direction of the tire, of an inclination groove 4 crossing to the lateral groove 3A. There is no first bottom-raising portion 10 in the other lateral groove 313 between a second shoulder center block 6B and a first shoulder block 6A adjacent thereto in the rotation direction of the tire. The first bottom-raising portion 10 is provided only in the every other lateral groove 3A of the lateral grooves 3. The two shoulder blocks 6 adjacent in the circumferential direction T of the tire are connected by the first bottom-raising portion 10, thereby increasing stiffness of the shoulder blocks 6.

Each shoulder block 6 has a tread surface section, where one subsidiary groove 8 extending in the widthwise direction of the tire is provided in its center in the circumferential direction of the tire. The subsidiary groove 8, which is less in width and depth than the lateral grooves 3, extends in an inclined manner like the lateral grooves 3 so that its inner terminal end 8x is away from an inclination groove 4 adjacent thereto and its outer terminal end 8y is located on a design end of the tread surface 1. The subsidiary groove 8A disposed in the first shoulder block 6A extends longer inward in the widthwise direction of the tire than the subsidiary groove 8B disposed in the second shoulder block 6B. The subsidiary groove 8 is placed such that it does not communicate with the inclination groove 4 as described above, whereby drainage characteristics are enhanced by the subsidiary groove 8 while a decrease in stiffness of the shoulder block 6 is suppressed. Each first shoulder block 6A has a tread surface section, where one sipe 9 extending straight from an inclination groove 4 adjacent thereto outward in the widthwise direction of the tire is provided.

The main groove 2 has first main groove portions 2A between the right and left first center blocks 5A, and second main groove portions 2B between the right and left second center blocks 5B. The first main groove portions 2A are each less in width than the second main groove portions 2B at a location of the tread surface 1. The first main groove portions 2A have the same widths as the second main groove portions 2B at the bottom of the main groove 2.

The second main groove portions 2B each have a width which gradually increases toward the reverse rotation direction of the tire at the location of the tread surface 1. The right and left second center blocks 5B each have a wall surface 5B1 beside the main groove 2. The wall surface 5B1 is inclined to the equatorial plane CL of the tire in cross section taken in a plane that contains the axis of rotation of the tire, and its inclination angle with respect to the equatorial plane CL of the tire gradually increases toward the reverse rotation direction of the tire. By gradually increasing the widths of the second main groove portions 2B toward the reverse rotation direction of the tire, a drainage effect arising from the second main groove portions 2B is enhanced. On the other hand, by gradually increasing the inclination angles, with respect to the equatorial plane CL of the tire, of the wall surfaces 5B1 of the right and left second center blocks 5B facing the gradually widening second main groove portions 2B toward the reverse rotation direction of the tire, reduction of stiffness of the second center blocks 5B is avoided when the widths of the second main groove portions 2B is gradually increased to thereby reduce the widths of the second center blocks 5B.

According to the present invention described above, since the shoulder blocks 6 are connected by the bottom-raising portions 10, stiffness of the shoulder blocks 6 can be enhanced. Therefore, tread stiffness on the shoulder sides affecting cornering operation can be increased. As a result, driving stability during running on a half dried road surface can be raised, enabling improvement of dry performance on a half dried road surface.

On the other hand, the bottom-raising portion 10 is not provided in each lateral groove 3 but is provided in every other lateral groove 3, and the bottom-raising portion 10 is provided in the lateral groove portion 3A1 outward of the tire ground contact end TE in the widthwise direction of the tire, whereby reduction of wet performance due to the bottom-raising portion 10 is suppressed, enabling wet performance to be kept at the same level as before.

When the pneumatic tire described above is used for racing carts, it is preferably applicable to a rear tire. When the pneumatic tire described above is used for a front tire of the racing carts, it is preferable that the following structure be further added thereto.

Figure 3:
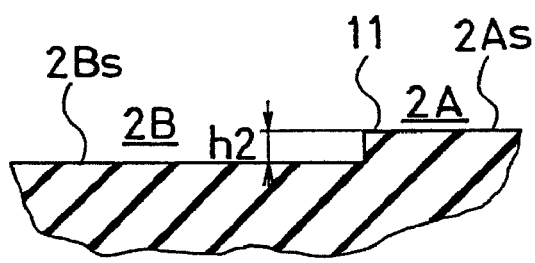
FIG. 3 is an enlarged cross-sectional view of the bottom of a main groove taken along line III-III of FIG. 1.

As shown in FIG. 3, a second bottom-raising portion 11 is provided in each first main groove portion 2A in such a manner that the bottom 2As of the first main groove portion 2A is higher than the bottom 2Bs of each second main groove portion 2B. Two first center blocks 5A standing on the opposite sides of the main groove 2 are connected by the second bottom-raising portion 11, thereby increasing stiffness of the first center blocks 5A.

Figure 4:
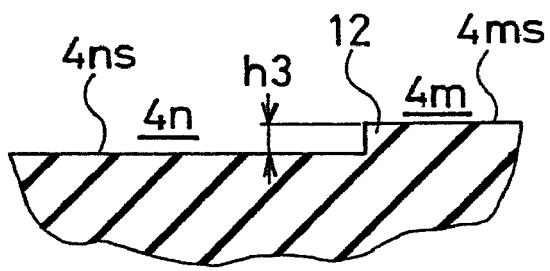
FIG. 4 is an enlarged cross-sectional view of the bottom of an inclination groove taken along line IV-IV of FIG. 1.

More preferably, as shown in FIG. 4, a third bottom-raising portion 12 is provided in each inclination groove 4 in such a manner that the tire rotation direction side portion 4m of the inclination groove 4 adjacent to the first center block 5A has a bottom 4ms which is higher than the bottom 4ns of the tire reverse rotation direction side portion 4n of the inclination groove 4. A first center blocks 5A and a first shoulder block 6A standing in the widthwise direction of the tire are connected by the third bottom-raising portion 12, thereby further increasing stiffness of the first center block 5A.

By employing the above structures, block stiffness in a center area of the tread surface 1 can be increased while reducing differences in stiffness between the first center blocks 5A that are smaller in size than the second center blocks 5B and second center blocks 5B that are larger in size than the first center blocks 5A. Therefore, tread center side stiffness greatly affecting handle operability when used for a front tire of a racing cart can effectively be enhanced in a balancing fashion around the circumference of the tire. Accordingly, handle operability during running on a half dried road surface is enhanced, enabling further improvement of dry performance on a half dried road surface.

In the present invention, the first bottom-raising portion 10 provided in the lateral groove 3 has a height h1, which is preferably in the range of 30% to 70% of the depth of the lateral groove from the bottom thereof. If the height h1 of the first bottom-raising portion 10 is less than 30% of the depth of the lateral groove, stiffness of the shoulder blocks 6 connected by the first bottom-raising portion 10 can not effectively be increased. If the height h1 of the first bottom-raising portion 10 is beyond 70% of the depth of the lateral groove, drainage characteristics are significantly deteriorated. The depth of the lateral groove 3 can be in the range of 4 mm to 7 mm.

The second bottom-raising portion 11 provided in the main groove 2 has a height h2, which is preferably in the range of 30% to 70% of the depth of the main groove from the bottom thereof. If the height h2 of the second bottom-raising portion 11 is less than 30% of the depth of the main groove, stiffness of the first center blocks 5A connected by the second bottom-raising portion 11 can not effectively be increased. If the height h2 of the second bottom-raising portion 11 is beyond 70% of the depth of the main groove, drainage characteristics are significantly deteriorated. The depth of the main groove 2 can be in the range of 4 mm to 8.5 mm.

The third bottom-raising portion 12 provided in the inclination groove 4 has a height h3, which is preferably equal to or greater than 30% of the depth of the inclination groove from the bottom thereof in terms of more effectively increasing stiffness of the first center block 5A connected thereby. The upper limit of the height h3 is preferably equal to or less than 70% of the depth of the inclination groove from the viewpoint of drainage characteristics. The depth of the inclination groove 4 can be in the range of 4 mm to 7 mm.

The widths of the first main groove portions 2A and second main groove portions 2B are preferably arranged such that the ratio W2/W1 of the maximum width W2 of each second main groove portion 2B to the minimum width W1 of each first main groove portion 2A is in the range of 2.5 to 4.5. If the ratio W2/W1 is under 2.5, reduction of wet performance and uneven wear are apt to occur. If the ratio W2/W1 is beyond 4.5, driving stability on a half dried road surface is badly influenced. Note that the first main groove portions 2A shown in FIG. 1 are constant in width, but the widths of the first main groove portions 2A may be varied.

The width of each second main groove portion 2B is preferably in the range of 6% to 11% of a ground contact width WE of the tire on the tread surface 1. If the width of the second main groove portion 2B is less than 6% of the ground contact width WE of the tire, drainage characteristics are degraded. If the width of the second main groove portion 2B is greater than 11% of the ground contact width WE of the tire, stiffness of the second center blocks 5B is lowered, whereby driving stability during running on a half dried road surface is badly influenced.

The first center blocks 5A each have a circumferential length LA, and the second center blocks 5B each have a circumferential length LB. The ratio LB/LA of the circumferential length LB to the circumferential length LA is preferably in the range of 1.1 to 1.9. If the ratio LB/LA is less than 1.1, stiffness of the second center blocks 5B is lowered, which badly influences driving stability during running on a half dried road surface. If the ratio LB/LA is greater than 1.9, a stiffness difference between the center blocks 5A and 5B is so great that uneven wear is apt to occur.

Each of the lateral grooves 3 has an inclination angle $\alpha$ with respect to the circumferential direction T of the tire, and the inclination angle $\alpha$ is preferably in the range of 40° to 60°. If the inclination angle $\alpha$ is under 40°, drainage characteristics are degraded. If the inclination angle $\alpha$ exceeds 60°, block stiffness is lowered, which badly influences driving stability during running on a half dried road surface. When the lateral groove 3 extends in a circularly curved manner as shown in FIG. 1, the inclination angle $\alpha$ is an inclination angle, with respect to the circumferential direction T of the tire, of a straight line M passing an inner terminal end 3x of the lateral groove 3 and a position 3z on the ground contact end TE of the tire which are located on the center line 3c of the lateral groove 3.

Each of the inclination grooves 4 has an inclination angle $\beta$ with respect to the circumferential direction T of the tire, and the inclination angle $\beta$ is preferably in the range of 10° to 30°. If the inclination angle $\beta$ is under 10°, drainage characteristics are degraded when cornering. If the inclination angle $\beta$ is beyond 30°, drainage characteristics are deteriorated when running straight. When the inclination groove 4 extends in a circularly curved manner as shown in FIG. 1, the inclination angle $\beta$ is an inclination angle, with respect to the circumferential direction T of the tire, of a straight line N passing opposite terminal ends 4x and 4y of the inclination groove 4 which are located on the center line 4c of the inclination groove 4.

The tread surface 1 has a center region 1C between positions away right and left from the equatorial plane CL of the tire by a distance of 55/2% of the ground contact width WE of the tire. The center region 1C has a groove area percentage, which is preferably in the range of 50% to 60%. If the groove area percentage is under 50%, drainage characteristics are degraded. If the groove area percentage is beyond 60%, block stiffness is lowered, whereby driving stability during running on a half dried road surface is badly influenced.

In the embodiment described above, each inclination groove 4 is provided so as to extend across three lateral grooves 3. However, the inclination groove 4 may be disposed so as to extend across more than three lateral grooves 3. The upper limit of the number of the lateral grooves 3 that the inclination groove 4 goes across is preferably eight at a maximum from the viewpoint of block stiffness although it is different in tire size.

The first bottom-raising portion 10 is preferably provided in the lateral groove 3A as described above from the viewpoint of a balance of stiffness in the circumferential direction T of the tire, because a tire reverse rotation direction side portion of the second shoulder block 6B which is the least in stiffness due to its narrowest width can have an increase in stiffness. However, the first bottom-raising portion 10 may be provided in the lateral groove 3B instead of the lateral groove 3A.

The present invention is preferably applicable to tires for racing carts in particular requiring high wet performance when running on a rainy day; however, the present invention is also suitable for application to pneumatic tires used for other vehicles as a matter of course.

It should be noted that the tire ground contact width WE and the tire ground contact ends TE referred in the present invention are a maximum ground contact width of the tread surface 1 and ground contact ends thereof when measured under such conditions that, when the tire is used for racing carts and has a tire size of 4.5×10.0-5, it is mounted on a rim having a service rim width of 4.5 inches and inflated to an air pressure of 100 kPa, and a load of 0.45 kN is applied thereto, and that, when the tire is used for racing carts and has a tire size of 6.0×11.0-5, it is mounted on a rim having a service rim width of 6.5 inches and inflated to an air pressure of 100 kPa, and a load of 0.65 kN is applied thereto. When the tire is a tire other than the tire for racing carts, the tire ground contact width WE and the tire ground contact ends TE referred in the present invention are a maximum ground contact width of the tread surface 1 and ground contact ends thereof when measured under such conditions that the tire is mounted on a standard rim specified by JATMA (Japanese Automobile tire manufacturer association) and inflated to an air pressure corresponding to the maximum load capacity specified by JATMA, and a load equivalent to 75% of the maximum load capacity is applied thereto.

EXAMPLE

Prepared respectively were test tires according to the present invention tire (present example) and control tire (control example), each having a tread pattern of FIG. 1, each used for a front tire having a tire size of 4.5×10.0-5, each used for a rear tire having a tire size of 6.06×11.0-5, the present invention tire having a bottom-raising portion provided on the bottom of a portion of every other lateral groove 3A outward of the tire ground contact end in the widthwise direction of the tire, the control tire having the same structure as the present invention tire except that the bottom-raising portion was not provided.

No bottom-raising portion is provided in the main groove or inclination groove of each test tire. The height of the bottom-raising portion of the present invention tire is 50% of the depth of the lateral groove. In each test tire, the ratio W2/W1 of the maximum width W2 of each second main groove portion to the minimum width W1 of each first main groove portion is 3.5, the ratio LB/LA of the circumferential length LB of each second center block to the circumferential length LA of each first center block is 1.5, the inclination angle α of each lateral groove with respect to the circumferential direction of the tire is 50°, and the inclination angle β of each inclination groove with respect to the circumferential direction of the tire is 20°. Further, in each test tire, the width of each second main groove portion gradually increases in the range of 6% to 11% of the tire ground contact width WE, and the groove area percentage of the center region is 55%.

The respective test tires were assembled to rims corresponding thereto, inflated to an air pressure of 100 kPa, and mounted on a vehicle (racing cart) of 125 cc displacement. Evaluation testing for wet performance, and driving stability (dry performance) on a half dried road surface was carried out according to the testing methods shown below, obtaining the results shown in Table 1.

Wet Performance

The car was run on a wet road test course having a water depth of 2 mm to 3 mm, and feeling testing for driving stability was conducted by a test driver. The evaluation result thereof is represented by an index where the control tire is 100. As the index is greater, wet performance is better. Note that the index range of 98 to 102 is a range equivalent to the prior art level.

Driving Stability on Half Dried Road Surface

The car was run on a test course having half dried conditions, and feeling testing for driving stability was conducted by a test driver. The evaluation result thereof is represented by an index where the control tire is 100. As the index is greater, driving stability on a half dried road surface is better.

TABLE 1

|  | Present Example | Control Example |
| --- | --- | --- |
| Wet Performance | 98 | 100 |
| Driving Stability on Half Dried Road Surface | 110 | 100 |

As seen from Table 1, the present invention tire has a wet performance index which is 98 and an index of driving stability on a half dried road surface which is 110, and can improve driving stability on a half dried road surface while obtaining wet performance at the same level as the prior art.

What is claimed is:

1. A pneumatic tire having a tread surface that has a specified tire rotation direction, shoulder blocks being defined on a shoulder side of the tread surface by lateral grooves extending in a widthwise direction of the tire beyond a ground contact end of the tire and having a depth within a range of 4 mm to 7 mm, the shoulder blocks being arranged in a circumferential direction of the tire, wherein a first bottom-raising portion having a height which is 30% to 70% of a depth of the lateral groove from a bottom thereof is provided on the bottom of a portion of only every other lateral groove of the lateral grooves such that the bottom of each of the every other lateral grooves has a step profile and so as to connect two shoulder blocks adjacent in the circumferential direction of the tire by the first bottom-raising portion, the every other lateral groove portion being outward of the ground contact end of the tire in the widthwise direction of the tire, a main groove extending in the circumferential direction of the tire is provided on an equatorial plane of the tire in the tread surface;

the lateral grooves extending in the widthwise direction of the tire beyond a ground contact end of the tire are further provided on another shoulder side of the tread surface, right and left lateral grooves on the shoulder sides being disposed at prescribed intervals in the circumferential direction of the tire, the right and left lateral grooves extending from the main groove toward opposite sides of the tire in the widthwise direction of the tire beyond ground contact ends of the tire in an inclined manner toward a reverse rotation direction of the tire;

right and left inclination grooves are provided on opposite sides of the main groove at prescribed intervals in the circumferential direction of the tire, the right and left inclination grooves extending across the right and left lateral grooves in such an inclined manner with respect to the circumferential direction of the tire that tire reverse rotation direction sides of the inclination grooves are more away from the main groove than tire rotation direction sides of the inclination grooves;

center blocks are defined on the opposite sides of the main groove by the main groove, the right and left lateral grooves and the right and left inclination grooves;

the shoulder blocks are defined on the opposite shoulder sides of the tread surface by the right and left lateral grooves and the right and left inclination grooves;

the right and left inclination grooves are disposed at symmetrical positions with respect to the equatorial plane of the tire;

the center blocks comprise right and left first center blocks defined by tire rotation direction side portions of the right and left inclination grooves, the main groove and the right and left lateral grooves, and right and left second center blocks defined by tire reverse rotation direction side portions of the right and left inclination grooves, the main groove and the right and left lateral grooves, a circumferential length of each second center block being greater than a circumferential length of each first center block; and a second bottom-raising portion is provided on a bottom of the main groove between each two first center blocks standing on the opposite sides of the main groove so as to connect the two first center blocks by the second bottom-raising portion, and wherein the pneumatic tire is a tire for a racing cart.

2. The pneumatic tire according to claim 1, wherein the second bottom-raising portions provided on the bottom of the main groove each has a height which is 30% to 70% of a depth of the main groove from the bottom thereof.

3. The pneumatic tire according to claim 1, wherein a third bottom-raising portion is provided on a bottom of each of the tire rotation direction side portions of the right and left inclination grooves adjacent to the first center blocks so as to connect a first center block and a shoulder block standing in the widthwise direction of the tire by the third bottom-raising portion.

4. The pneumatic tire according to claim 3, wherein the third bottom-raising portion provided on the bottom of each inclination groove has a height which is 30% to 70% of a depth of the inclination groove from the bottom thereof.

5. The pneumatic tire according to claim 1, wherein:
the every other lateral groove is located between a first shoulder block and a second shoulder block adjacent thereto in the rotation direction of the tire; and
the portion of the every other lateral groove where the first bottom-raising portion is provided is located outward of an inclination groove crossing therewith in the widthwise direction of the tire.

6. The pneumatic tire according to claim 1, wherein a width of the main groove between the right and left first center blocks is less than a width of the main groove between the right and left second center blocks.

7. The pneumatic tire according to claim 1, wherein the shoulder blocks each have a subsidiary groove extending in the widthwise direction of the tire away from an inclination groove adjacent thereto, the subsidiary groove being less in width and in depth than the inclination groove.

* * * * *